(12) United States Patent
Du et al.

(10) Patent No.: US 10,129,571 B2
(45) Date of Patent: *Nov. 13, 2018

(54) TECHNIQUES FOR MEDIA QUALITY CONTROL

(71) Applicant: INTEL CORPORATION, Santa Clara, CA (US)

(72) Inventors: Yangzhou Du, Beijing (CN); Yurong Chen, Beijing (CN); Qiang Li, Beijing (CN); Wenlong Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,505

(22) Filed: Feb. 13, 2017

(65) Prior Publication Data

US 2017/0251234 A1 Aug. 31, 2017

Related U.S. Application Data

(63) Continuation of application No. 13/976,450, filed as application No. PCT/CN2012/073293 on Mar. 30, 2012, now Pat. No. 9,571,864.

(51) Int. Cl.
| | |
|---|---|
| *H04H 60/33* | (2008.01) |
| *H04N 7/10* | (2006.01) |
| *H04N 21/234* | (2011.01) |
| *H04N 21/2543* | (2011.01) |
| *H04N 21/485* | (2011.01) |
| *H04N 21/488* | (2011.01) |
| *H04N 21/2743* | (2011.01) |

(52) U.S. Cl.
CPC .. *H04N 21/23418* (2013.01); *H04N 21/25435* (2013.01); *H04N 21/2743* (2013.01); *H04N 21/485* (2013.01); *H04N 21/4854* (2013.01); *H04N 21/4882* (2013.01); *H05K 999/99* (2013.01)

(58) Field of Classification Search
None
See application file for complete search history.

(56) References Cited

U.S. PATENT DOCUMENTS

| | | | | |
|---|---|---|---|---|
| 5,909,602 A * | 6/1999 | Nakai | ................... | G03G 21/046 358/1.15 |
| 6,917,826 B2 * | 7/2005 | Wei | ....................... | G06T 7/0012 128/898 |
| 7,764,844 B2 * | 7/2010 | Bouk | ..................... | G06T 7/0004 382/250 |
| 8,185,927 B2 * | 5/2012 | Karaoguz | ............ | H04N 21/235 725/105 |
| 8,245,266 B2 * | 8/2012 | Jefremov | ................ | H04N 7/148 348/14.01 |
| 8,799,946 B2 * | 8/2014 | Cake | .................. | H04N 5/44543 348/569 |

(Continued)

*Primary Examiner* — An Son P Huynh

(57) ABSTRACT

Techniques for media quality control may include receiving media information and determining the quality of the media information. The media information may be presented when the quality of the media information meets a quality control threshold. A warning may be generated when the quality of the media information does not meet the quality control threshold. Other embodiments are described and claimed.

20 Claims, 10 Drawing Sheets

(56) References Cited

U.S. PATENT DOCUMENTS

| | | | | |
|---|---|---|---|---|
| 8,982,185 B1* | 3/2015 | Shastri | H04N 21/23418 348/43 |
| 9,482,682 B2* | 11/2016 | Ikeda | C01N 35/00663 |
| 2002/0007485 A1* | 1/2002 | Rodriguez | H04N 5/44543 725/1 |
| 2003/0005454 A1* | 1/2003 | Rodriguez | G06Q 30/0601 725/89 |
| 2003/0023910 A1* | 1/2003 | Myler | H04N 17/004 714/704 |
| 2003/0085888 A1* | 5/2003 | Lafruit | G06F 9/5027 345/419 |
| 2004/0174464 A1* | 9/2004 | MacInnis | H04N 9/78 348/667 |
| 2005/0240961 A1* | 10/2005 | Jerding | H04N 5/44543 725/37 |
| 2006/0120624 A1* | 6/2006 | Jojic | G06F 17/30843 382/284 |
| 2006/0126919 A1* | 6/2006 | Kitaura | H04N 13/0018 382/154 |
| 2007/0063834 A1* | 3/2007 | Bozzone | A63H 30/04 340/539.1 |
| 2007/0143775 A1* | 6/2007 | Savoor | G06Q 30/06 725/1 |
| 2007/0208989 A1* | 9/2007 | Hamzy | G06F 11/0742 714/763 |
| 2008/0141317 A1* | 6/2008 | Radloff | H04N 5/44582 725/87 |
| 2009/0142041 A1* | 6/2009 | Nagasawa | H04N 13/0033 386/341 |
| 2009/0313546 A1* | 12/2009 | Katpelly | H04N 7/17318 715/723 |
| 2010/0045780 A1* | 2/2010 | Kwon | H04N 13/0048 348/51 |
| 2011/0032338 A1* | 2/2011 | Raveendran | H04N 21/816 348/51 |
| 2011/0110572 A1* | 5/2011 | Guehring | A61B 6/5258 382/131 |
| 2011/0157312 A1* | 6/2011 | Kawakami | H04N 13/0066 348/46 |
| 2011/0321091 A1* | 12/2011 | Lee | H04N 13/0454 725/39 |
| 2012/0098831 A1* | 4/2012 | Kim | H04N 13/0018 345/426 |
| 2012/0128322 A1* | 5/2012 | Shaffer | H04N 9/8205 386/241 |
| 2012/0200668 A1* | 8/2012 | Maruyama | H04N 13/0055 348/43 |
| 2012/0257795 A1* | 10/2012 | Kim | H04N 13/0022 382/106 |
| 2012/0262549 A1* | 10/2012 | Ferguson | H04N 13/0018 348/46 |
| 2012/0269425 A1* | 10/2012 | Marchesotti | G06K 9/036 382/159 |
| 2012/0300027 A1* | 11/2012 | Urisu | H04N 13/007 348/43 |
| 2012/0307265 A1* | 12/2012 | Jacobs | G06K 15/027 358/1.9 |
| 2013/0002814 A1* | 1/2013 | Park | G06T 5/006 348/43 |
| 2013/0050574 A1* | 2/2013 | Lu | G06K 9/00751 348/441 |
| 2013/0057705 A1* | 3/2013 | Parker | H04N 17/004 348/184 |
| 2013/0070202 A1* | 3/2013 | Yonezawa | G06T 7/0012 351/206 |
| 2013/0083002 A1* | 4/2013 | Hwang | H04N 13/0022 345/419 |
| 2013/0152115 A1* | 6/2013 | Albal | H04N 21/4331 725/14 |
| 2013/0215239 A1* | 8/2013 | Wang | G06T 7/579 348/50 |
| 2013/0250055 A1* | 9/2013 | Cho | H04N 19/597 348/43 |

\* cited by examiner

TECHNIQUES FOR MEDIA QUALITY CONTROL

CROSS-REFERENCE TO RELATED APPLICATIONS

This application is a continuation of, claims the benefit of, and claims priority to U.S. National Phase patent application Ser. No. 13/976,450, filed Jun. 26, 2013, which claims priority to U.S. international patent application number PCT/CN12/73293, filed Mar. 30, 2012; both of the above are incorporated herein by reference in their entireties.

BACKGROUND

Media information may be easily created and shared with others. For example, a user may create a three dimensional video which can be uploaded and presented to other users via the internet. Video sharing websites allow non-professional filmmakers to upload videos. As three dimensional video becomes more popular and common, more people are creating and sharing three dimensional videos.

Three dimensional videos created by non-professionals often have poor quality. Poor quality three dimensional video may cause negative physical symptoms to occur to a user viewing the video. For example, poor quality three dimensional video may cause headaches or eyestrain. In some cases, poor quality three dimensional video may even cause a serious impact on the health of the user. It is with respect to these and other considerations that the present improvements have been needed.

DETAILED DESCRIPTION

Figure 1:
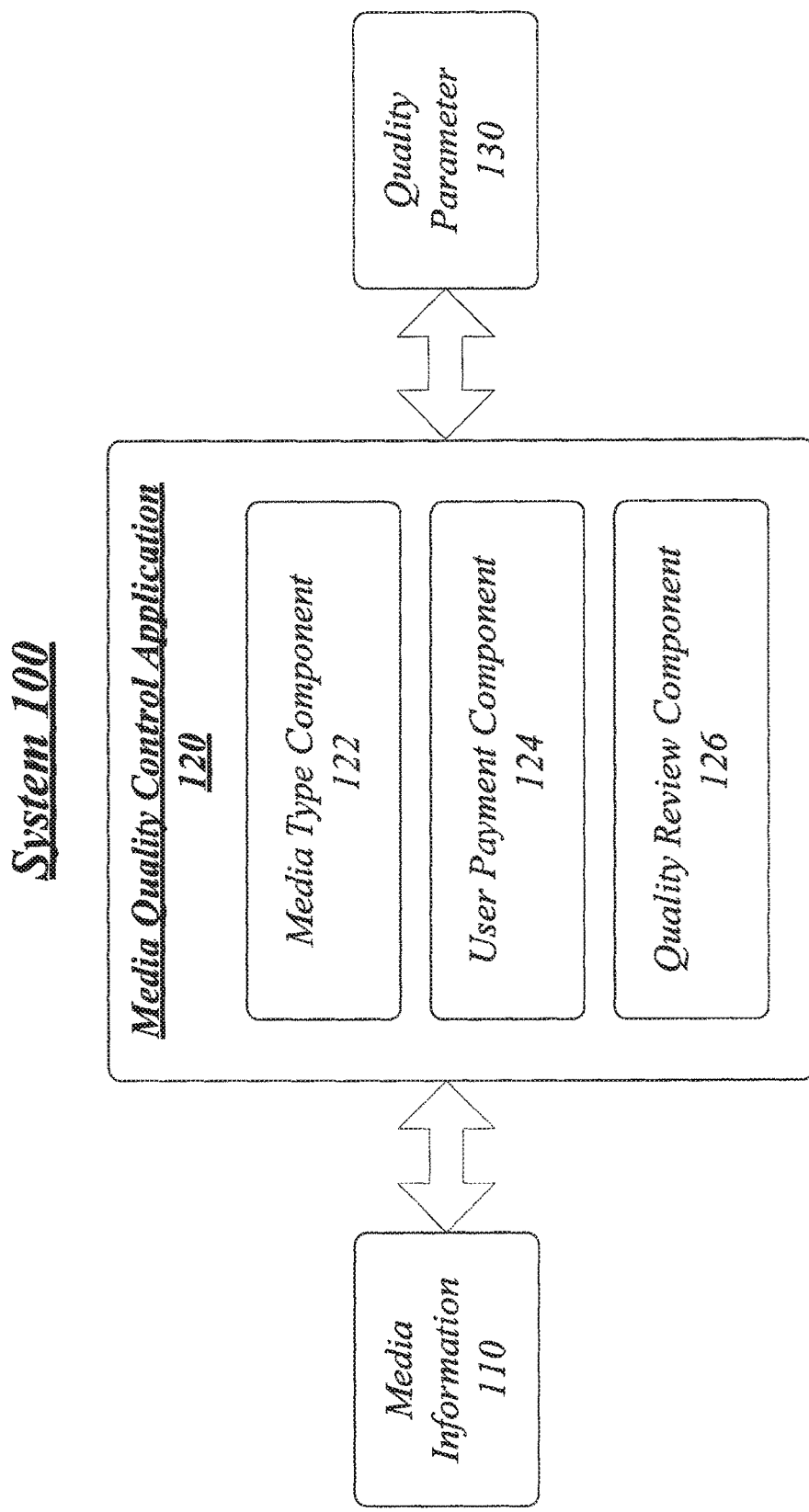
FIG. 1 illustrates an embodiment of a system.

Various embodiments are generally directed to ensuring quality control of media information. A computing device may present media information, such as three dimensional video, for example. However, the media information may be of poor quality. The embodiments allow a user to be warned prior to viewing poor quality three dimensional video. In this manner, a viewer may have a superior experience when watching three dimensional videos.

Some embodiments are particularly directed to techniques for receiving media information and determining the quality of the media information. The media information may be presented when the quality of the media information meets a quality control threshold. A warning may be presented when the quality of the media information does not meet the quality control threshold. As a result, a user can be assured that the three dimensional video meets a quality review threshold, thereby enhancing the viewing experience of the user.

In one embodiment, for example, an apparatus may comprise a processor circuit and a media quality control application. The media quality control application may include a quality review component which determines the quality of the media information based on one or more quality control criteria. The quality review component may present the media information when the quality of the media information meets a quality control threshold and may generate a warning when the quality of the media information does not meet the quality control threshold.

The embodiments provide several advantages over conventional techniques used to review the quality of three dimensional videos. For instance, as a result of the quality review application, users can be assured that the quality of the media information meets some desired level of quality as represented by the quality control threshold. By having the quality control application issue a warning prior to presenting a poor quality video, a user's health can be protected from headaches, eyestrain, nausea, motion sickness, seizures, or other physical symptoms. Additionally, providing a media quality control application on a server allows multiple users the opportunity to have the quality of the three dimensional videos checked prior to having an unpleasant viewing experience. For example, an internet provider may offer users the opportunity to have the quality of the media information evaluated prior to presenting the media information on the user's computing device in order to enhance the user's viewing experience. The embodiments may improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The system 100 may comprise the media quality control application 120. The media quality control application 120 may be generally arranged to assist a user in determining whether media information is of a sufficient quality. As shown in FIG. 1, the media quality control application 120 may receive media information 110, analyze and evaluate a quality of the media information 110, and output a quality parameter 130. Media information 110 may include, but is not limited to, three dimensional video, two dimensional video, three dimensional games or two dimensional games. The quality parameter 130 may represent a defined level of quality of the media information 110 based on various statistical measurements suitable for a given set of media information 110. Additionally or alternatively, the quality parameter 130 may comprise a binary parameter (e.g., 0 or 1, TRUE or FALSE) indicating whether the media information 110 should be delivered to a device. Note that while three dimensional video and games are presented as embodiments, the media quality control threshold is not limited to three dimensional games and video.

The media quality control application 120 may measure the media information by various quality control criteria such as, but not limited to, alignment, depth of field, improper objects and mismatch values. The measurement of the media information by the media quality control application 120 may ensure that the media meets a certain quality control threshold. The media quality control application 120 may determine whether the media meets a quality control threshold in order to ensure that the media information is safe for a user to view. In order to protect users from watching poor quality media information, the media quality control application 120 may provide a warning when the media information does not meet the quality control threshold. As a result, a user may be prevented from experiencing dizziness, headaches, nausea, seizures, motion sickness and other physical health problems associated with poor quality media.

In the illustrated embodiment shown in FIG. 1, the media quality control application 120 may comprise a media type component 122, a user payment component 124 and a quality review component 126. It may be appreciated that more or less components may be used in a desired implementation.

The media quality control application 120 may comprise a media type component 122. The media type component 122 may generally receive the media information and determine whether the media information is a three dimensional video or a three dimensional game. Three dimensional videos include one or more non-interactive frames. Examples of three dimensional videos include, but are not limited to, three dimensional television and/or three dimensional movies. Three dimensional games include one or more interactive frames. An interactive frame may wait for a user input in order to determine a subsequent frame. As a result of the frames being interactive, the media quality control application 120 may not necessarily determine the quality of every frame of the three dimensional games. Examples of three dimensional games include, but are not limited to, three dimensional video games, board games, games of chance, card games, and so forth. The embodiments are not limited in this context.

The media quality control application 120 may comprise a user payment component 124. In some embodiments, the user payment component 124 may be optional.

The user payment component 124 may be included, for example, when the media quality control application 120 is implemented on a server. The user payment component 124 may be an electronic commerce component which generally ensures payment is received prior to assessing the quality of the media for a user.

The user payment component 124 may determine a payment status associated with the user of the media information. The payment status determined by the user payment component 124 may indicate whether the quality of the media information should be evaluated. The payment status may indicate whether the user has paid, pre-paid and/or has a subscription to the media quality control application 120. The user payment component 124 may determine the payment status via a login by the user.

The user payment component 124 may accept payment from a user in a variety of fee structures. For instance, the user payment component 124 may allow a user to pay per media information to be evaluated. For example, a user may pay two dollars for a three dimensional video to be evaluated by the media quality control application 120. In another example, the user payment component 124 may allow a user to make a payment via a user subscription. The user payment component 124 may offer multiple subscription types to a user. The user payment component 124 may accept a flat fee each month, biannually, annually or some other designated amount of time. In yet another example, the user payment component 124 may accept a fee based on the amount of media files evaluated. One fee may cover up to a certain amount of media files to be evaluated while a higher fee may cover a greater amount of media information to be evaluated. In still another example, the user payment component 124 may accept a combination of fee structures. For example, the user payment component 124 may accept a certain payment for twenty media files to be evaluated each month, but the user payment component 124 may charge an additional fee once the twenty media files have been evaluated within the month. The embodiments are not limited to these examples.

The media quality control application 120 may comprise a quality review component 126. The quality review component 126 may be generally arranged to determine whether a quality level of the media information meets some minimum acceptable level of quality for a user viewing the media information. The quality review component 126 may perform image analysis on non-interactive frames of two dimensional and/or three dimensional videos. The quality review component 126 may measure the media quality by various quality control criteria.

Figure 2:
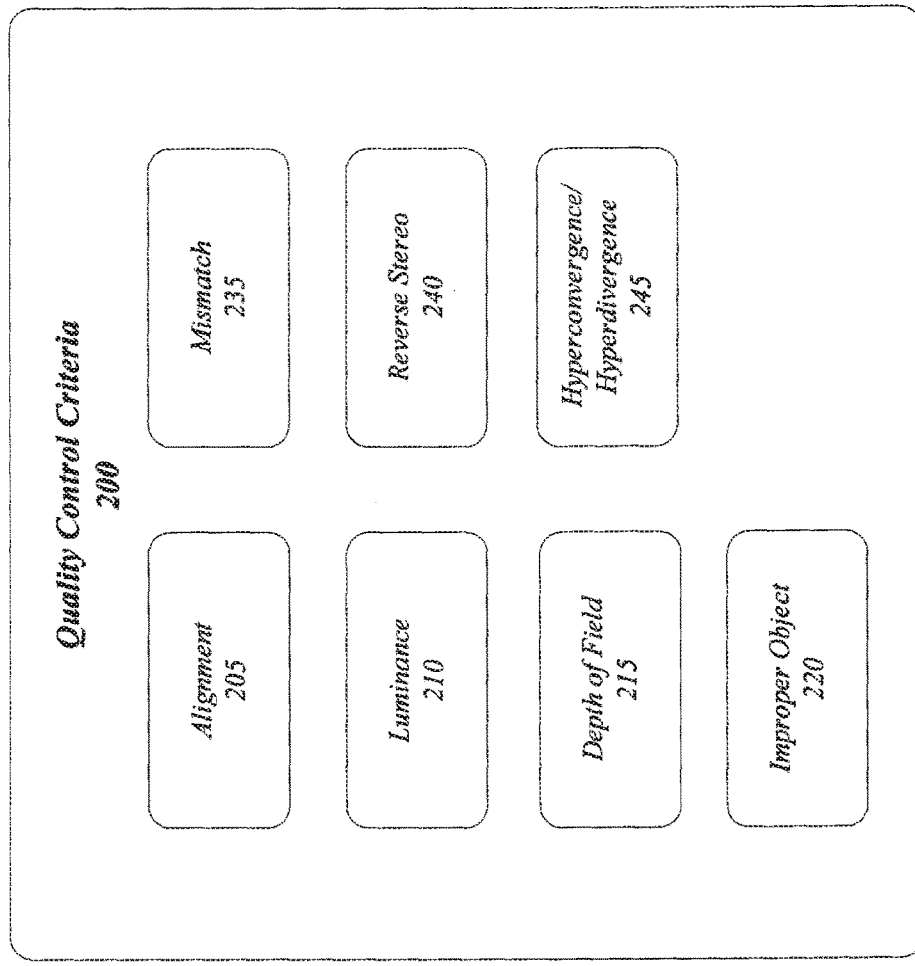
FIG. 2 illustrates an embodiment of a logic flow for the system of FIG. 1.

FIG. 2 illustrates an embodiment of various quality control criteria. Quality control criteria 200 are generally a set of testing measures to uncover defects in the media information. Quality control criteria 200 may include, but are not limited to, alignment 205, luminance 210, depth of field 215, improper object 220, mismatch 235, reverse stereo 240 and/or, hyperconvergence/hyperdivergence 245. The embodiments are not limited to these examples.

The quality control criteria 200 may include an alignment 205 criteria. The alignment 205 criteria may determine whether there is proper alignment of left and right images in the frames of the media information. For example, the alignment 205 criteria may determine whether there is proper vertical alignment and/or horizontal alignment of the left and right images in the frames of the media information.

The quality control criteria 200 may include a luminance 210 criteria. The luminance 210 criteria may compare the color of the left image to the color of the right image in the frames of the media information. The luminance 210 criteria may include, but is not limited to, colorimety. Luminance 210 criteria may comprise the images based on lighting such as darkness and brightness. Luminance 210 criteria may determine whether the images in the frames of the media information have the same hues.

The quality control criteria 200 may include a depth of field 215 criteria. The depth of field 215 criteria may determine the focus of the image of the media information. The depth of field 215 criteria may determine whether the focuses of one or more of the left and right images in the frames of the media information match.

The quality control criteria 200 may include an improper object 220 criteria. The improper object 220 criteria may include, but is not limited to, reflections, polarization, dirt, water and/or other particles. The improper object 220 criteria may determine whether there is an object such as, but not limited to, a reflection or dirt, on either the left or right image that does not appear on the other image in the frame of the media information.

The quality control criteria 200 may include a mismatch 235 criteria. The mismatch criteria 235 may refer to the timing of the left and right images in the frames of the media information. For example, the left image may be out of time synchronization with the right image. The left and right image may have edge, depth, and/or visual mismatch. An edge mismatch may occur when the edges of the left image and the edge of the right image do not match. For example, the left edge of the left image may not match up with the left edge of the right image in the media information. A depth mismatch may occur when one or more objects in a three dimensional scene do not appear at a proper depth in a frame of the media information. A visual mismatch may occur when a three dimensional element in a left or right image does not match the three dimensional element in the other image in the frame of the media information.

The quality control criteria 200 may include a reverse stereo 240 criteria. The reverse stereo 240 criteria may be a full or a partial reverse stereo. The full reverse stereo 240 criteria may determine whether the images in the left and right images in a frame of the media information are swapped. The partial reverse stereo 240 criteria may determine whether the one or more layers in the left and right images in a frame of the media information are swapped.

The quality control criterion 200 may include a hyperconvergence/hyperdivergence 245 criteria. The hyperconvergence/hyperdivergence 245 criteria may determine whether one or more objects in a frame of the media information are too close or too far away from a user's eye. The hyperconvergence/hyperdivergence 245 criteria may determine whether the objects in a frame of the media information are within a proper distance range.

Referring back to FIG. 1, the quality review component 126 may use the quality control criteria 200 to determine a quality parameter 130 for the media information 110. The quality parameter 130 may then be compared to a quality control threshold. The quality control threshold may be a minimum acceptable value for downloading media information 110 to the user. The quality control threshold may comprise minimum acceptable values for one or more criteria. For example, a quality control threshold may have a mismatch value of less than 3% and an improper object value of less than 10%.

The quality review component 126 may use a scoring system to evaluate the quality control criteria 200. The quality review component 126 may have the quality control threshold represented by a score or level. For example, a 5-point score may be used to indicate the quality level for one or more criteria. Level 1 may indicate terrible quality, level 2 may indicate poor quality, level 3 may indicate acceptable quality, level 4 may indicate good quality and level 5 may indicate excellent quality. A user may set their own quality threshold and may chose what level or score they deem acceptable to watch. A user may set a level or score for the quality control threshold for one or more independent criteria and/or for two or more combined criteria. The embodiments are not limited to these examples.

The quality review component 126 may evaluate the quality control criteria 200 via an algorithm to determine whether the quality control criteria meet the quality control threshold. The quality review component 126 may evaluate the quality control criteria 200 independently via separate algorithms to determine whether each criteria meets the quality control threshold. The quality review component 126 may evaluate one or more of the quality control criteria 200 together via a single algorithm to determine whether the media information 110 in its entirety meets the quality control threshold. For example, if one or more frames of the media information 110 do not meet a threshold, the quality review component 126 may determine the length of time and/or the percentage of the frames of the media information 110 affected in order to determine if the media information 110 as a whole meets the quality control threshold. For example, an improper object may appear for two seconds on the media information 110. However, the quality of the media information may still meet the quality control threshold despite this imperfection.

The quality review component 126 may determine whether a quality parameter 130, representing a defined quality level for the media information 110, meets the threshold quality control. If the quality of the media information 110 meets the threshold quality control, the quality review component 126 may allow the media information 110 to be accessed and presented by a device. If the quality of the media information 110 does not meet the threshold quality control, however, the quality review component 126 may generate a warning, such as a user interface element for a user interface view providing a warning message using text information, audio information, visual information, tactile information, olfactory information, and other modalities. The warning issued by the quality review component 126 may inform a user that the quality of the media information is poor.

Figure 3:
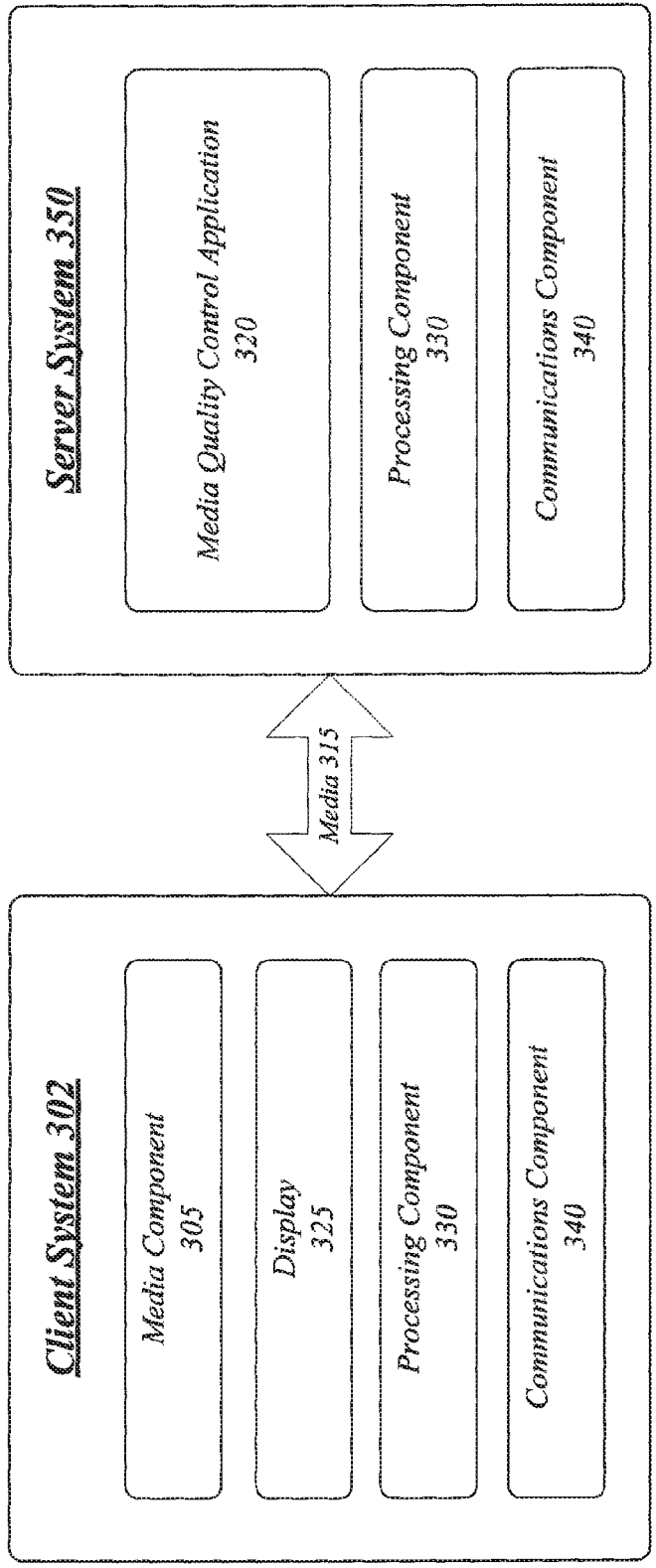
FIG. 3 illustrates a block diagram of a distributed system.

FIG. 3 illustrates a block diagram of a distributed system 300. The distributed system 300 may distribute portions of the structure and/or operations for the systems 100 across multiple computing entities. Examples of a distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In various embodiments, the client system 302 may comprise or employ one or more client computing devices and/or client programs that operate to perform various methodologies in accordance with the described embodiments. A client system 302 may include, without limitation, a mobile device, a personal digital assistant, a mobile computing device, a smart phone, a computer, a personal computer (PC), a desktop computer, a laptop computer, a notebook computer, a handheld computer, a tablet computer. The embodiments are not limited in this context.

The client system 302 may include a media component 305. The media component may be generally arranged to allow a user to obtain and/or share media information with the media quality control application 310 in the server system 350. The media component 305 may communicate with the media quality control application 310 in the server system 350. The media component 305 may include media information that a user wishes to present to the client system 302 from the server system 350 and/or from the server system 350 to the client system 302. Presenting media information may include, but is not limited to, streaming the media information from internet via the server system 350 to the client system 302, uploading the media information from the client system 302 to internet via the server system 350 and/or downloading the media information from the internet via the server system 350.

The client system 302 may include a display 325. The display 325 may present the media information and/or a warning that the media information does not meet the quality control threshold. The display 325 may include a digital display. The display 325 may comprise cathode ray tube (CRTs), liquid crystal displays (LCDs), light emitting diode displays (LEDs), organic light emitting diode displays (OLEDs) or any other type of display.

The client system 302 and the server system 350 may execute processing operations or logic for the system 100 using processing components 330. The processing component 330 may comprise various hardware elements, software elements, or a combination of both. Examples of hardware elements may include devices, components, processors, processor circuits, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The client system 302 and the server system 350 may execute communications operations or logic for the system 100 using communications components 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 315 may include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 315.

The server system 350 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 350 may include, for example, stand-alone and enterprise-class server computers operating a server OS such as a MICROSOFT OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

The server system 350 may implement the media quality control application 320. The media quality control application 320 may be generally arranged to evaluate the quality of received media information. The media quality control application 320 may receive a request from the client system 302. The request may be from a user wishing to download and/or stream media information from an internet website to the client system 302. The request may be from a user wishing to upload media information from the client system 302 to the server system 350. For example, the server system 350 may receive a request from the client system 302. The request may identify the media information to download. The media quality control application 320 in the server system 350 may evaluate the quality of received media information.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
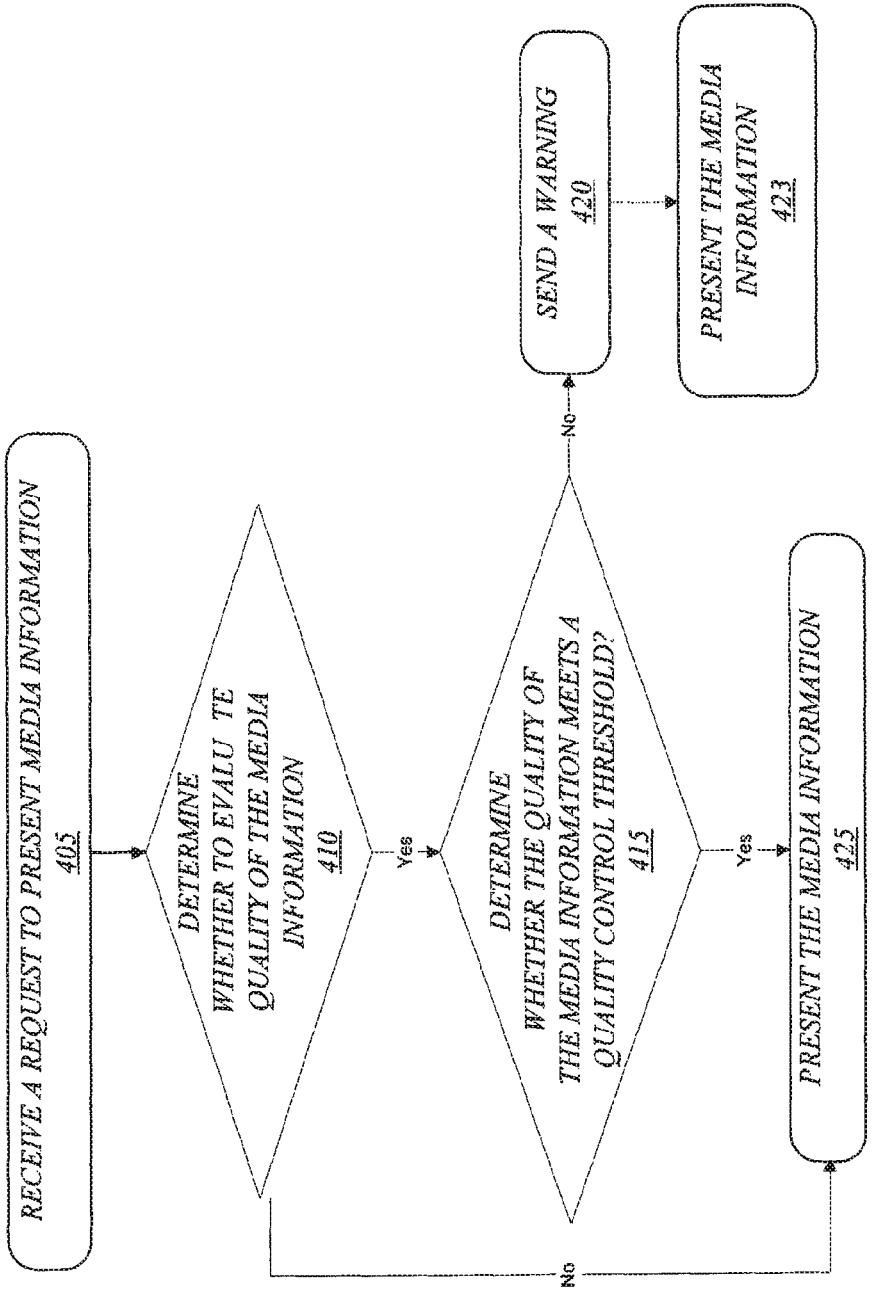
FIG. 4 illustrates a first logic flow.

FIG. 4 illustrates a logic flow of downloading media information from the server system. The media quality control application in the server system may determine whether to present the media information. The logic flow 400 may receive a request to present the media information at block 405. The request may be received by the media quality control application 120. The request may identify particular media information to present. For example, the request may identify a particular three dimensional video that a user associated with the client system would like to view.

The logic flow 400 may determine whether to evaluate quality of the media information at block 410. The determination of whether to evaluate the quality of the media information may be based on the media type and/or the user payment status associated with the media information. As discussed in FIG. 1, the media type is a classification as to whether the media information is a three dimensional video or a three dimensional game. As three dimensional games have interactive frames, the media quality control application may not necessarily determine the quality of the three dimensional games and the media information may be presented without a quality determination 425.

As discussed in FIG. 1, the user payment status may indicate whether the media quality control application should evaluate the quality of the media information 110. When the payment status indicates that a form of payment is received from a user associated with the media information 110, then the quality of the media information 110 may be evaluated. The form of payment may include a payment for a particular piece of media to be evaluated, a pre-payment and/or a subscription to the media quality control application. If no payment has been made for analyzing the media information 110, the media information 110 may pass through without any analysis, blocked from downloading to a device, or some other default action.

The logic flow 400 may determine whether the quality of the media information meets a quality control threshold at block 415. The quality control threshold may include one or more quality control criteria 200. The quality control criteria 200 may include, but are not limited to, alignment 205, mismatch 235 and luminance 210. One or more quality control criteria 200 may be evaluated via an algorithm to determine whether the quality control criteria 200 meet a quality control threshold. An algorithm may evaluate the criteria and determine whether the quality control criteria 200, individually or collectively as the quality parameter 130, meet the quality review threshold. The quality control criteria 200 may be weighted to reflect when some of the quality control criteria 200 are more critical than others in meeting the quality control threshold requirements. For example, an improper object such as dirt may appear for five seconds and the media information may meet the quality control threshold of a user selected level of 4, but hyper-convergence may appear for two seconds and the quality of the media information may fail the level 4 quality control threshold.

The logic flow 400 may send a warning when the quality of the media information does not meet the quality control threshold at block 420. The warning may be used to alert a user that the media information 110 may have poor quality and that viewing the media information may potentially injure the user's health. The media control application 120 may send a warning from the server system 350 to the client system 302 to inform the user that the media information 110 did not meet the quality standards. After the warning is issued, the user may have an option to download 423 the poor quality media information 110 or the user may be prevented from viewing the poor quality media information 110.

The logic flow 400 may present the media information when the quality of the media information meets the quality control threshold at block 425. The media information 110 may be presented by downloading or streaming the media information 110 from the server system 350 to the client system 302 via communications media 315.

Figure 5:
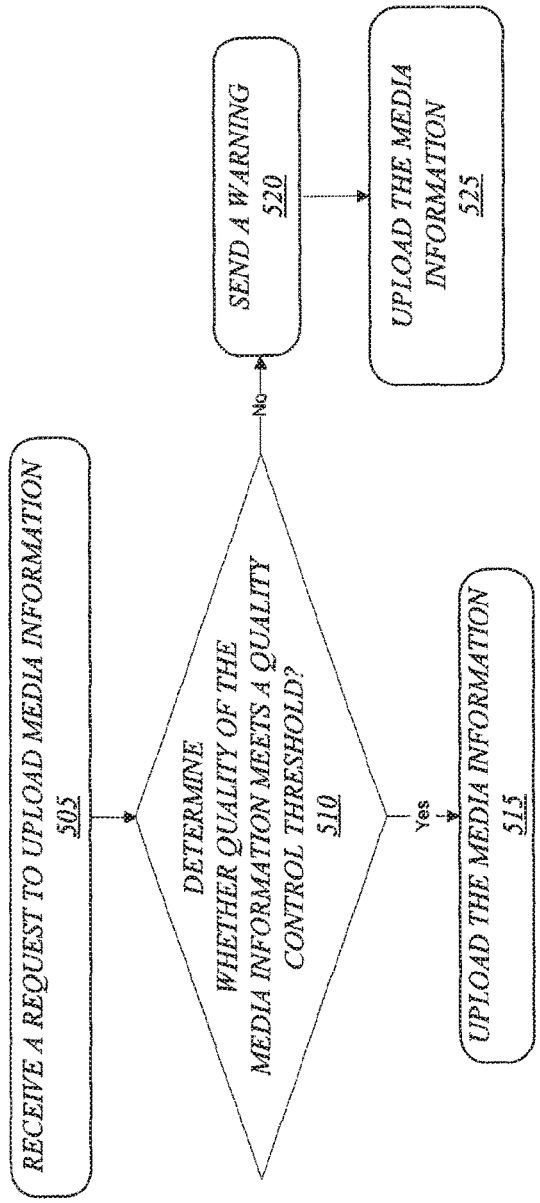
FIG. 5 illustrates a second logic flow.

FIG. 5 illustrates a logic flow of uploading media information to a server system. The media quality control application 120 in the server system 350 may determine whether to upload the media information 110. The logic flow 500 may receive a request to upload media information at block 505. A user may wish to upload media information 110 to the internet or to any other suitable device or server. For example, the user may wish to upload media information 110 to a video sharing website, a public or private network storage device, social media system, or other network device or service. A user may upload the media information 110 by using the client system 302. The client system 302 may send the media information 110 to the server system 350. The request may be received at the media quality control application 120 in the server system 350. The request may identify a particular media information 110 to upload. For example, the request may include a particular three dimensional video that the user would like to upload.

The logic flow 500 may determine whether the quality of the media information meets a quality control threshold at block 510. The media quality control application 120 may evaluate the quality of the media information 110. The quality of the media information 110 may be evaluated so that only media information 110 which meets the quality control threshold may be uploaded and stored. The quality of the media information 110 may be evaluated so that users may stream and/or download the media information 110 without fear that viewing the media information 110 will negatively affect his/her health.

The logic flow 500 may store the media information at block 515. When the media information 110 meets the quality control threshold, the media information 110 may be uploaded and stored on the server system 350.

The logic flow 500 may send a warning when the quality of the media information does not meet the quality control threshold at block 520. The media information 110 may have poor quality and may injure a user's health. The media control application 120 may send a warning from the server system 350 to the client system 302 to inform the user that the media information 110 did not meet the quality control threshold. As the quality control threshold was not met, the user may be prevented from uploading the poor quality media information 110. Alternatively, the user may upload 525 the poor quality media information 110. If the server 350 stores the media information 110, the server 350 may store the poor quality media information 110 in a separate location from the media information 110 which meets the quality control standards in order to differentiate the poor quality media information 110. Additionally or alternatively, the server 350 may generate and present a quality indicator representing the quality parameter 130. The quality indicator may comprise a user interface element, such as an icon, text, alphanumeric characters, symbol, picture, image, thumbnail, video indicator, audio indicator, tactile indicator, animation, and other suitable user interface elements capable of conveying varying levels of quality for the media information 110.

Figure 6:
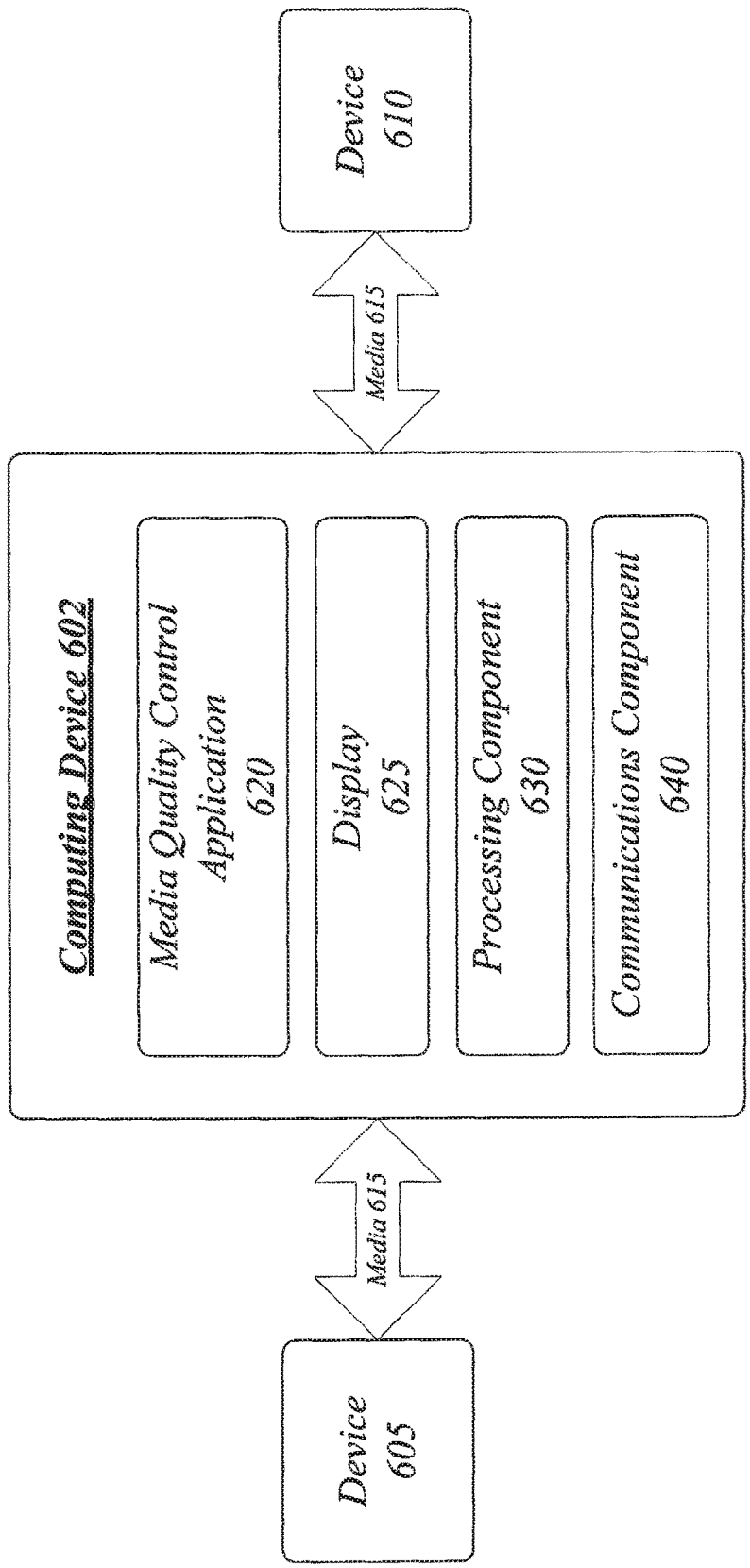
FIG. 6 illustrates a block diagram of a centralized system.

FIG. 6 illustrates a block diagram of a centralized system 600. The centralized system 600 may implement some or all of the structure and/or operations for the system 100, in a single computing entity, such as entirely within a single computing device 602.

A computing device 602 may include, without limitation, a mobile device, a personal digital assistant, a mobile computing device, a smart phone, a cellular telephone, a handset, an one-way pager, a two-way pager, a messaging device, a computer, a personal computer (PC), a desktop computer, a laptop computer, a notebook computer, a handheld computer, a tablet computer, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing device 602 may process information using the processing component 630, which is similar to the processing components 330 described with reference to FIG.

3. The computing device 602 may communicate with other devices 605, 610 over a communications media 615 via a communications component 640, which is similar to the communications components 340 and communication media 315 described with reference to FIG. 3.

The computing device 602 may include a display 625. The display 625 may include a digital display. The display 625 may comprise cathode ray tube (CRTs), liquid crystal displays (LCDs), light emitting diode displays (LEDs), organic light emitting diode displays (OLEDs) or any other type of display. The display 625 may present the media information and/or a warning that the media information does not meet the quality control threshold.

The computing device 602 may include the media quality control application 620. The media quality control application 620 may be representative of, for example, the media quality control application 120 as described with reference to FIG. 1. The media quality control application 620 may be implemented on a computing device 602. By having the media quality control application 620 implemented on a computing device 602, a user of the computing device 602 may ensure that the media information 110 viewed on the computing device 602 has met the quality control threshold. Having the media quality control application 620 on a computing device may protect a user from viewing media information 110 which may injure his/her health. When the media quality control application 620 is implemented on a computing device 602, the user payment component 124 may not be enabled as the computing device 602 may determine the quality of media information 110 for all media information 110 regardless of payment status.

The media quality control application 620 may determine whether the quality of the media information 110 meets a quality control threshold, as previously described. When the quality of the media information 110 meets the quality control threshold, the media information 110 may be presented on the computing device 602 via one or more of downloading or streaming techniques. The media information 110 may then be presented on the display 625.

Figure 7:
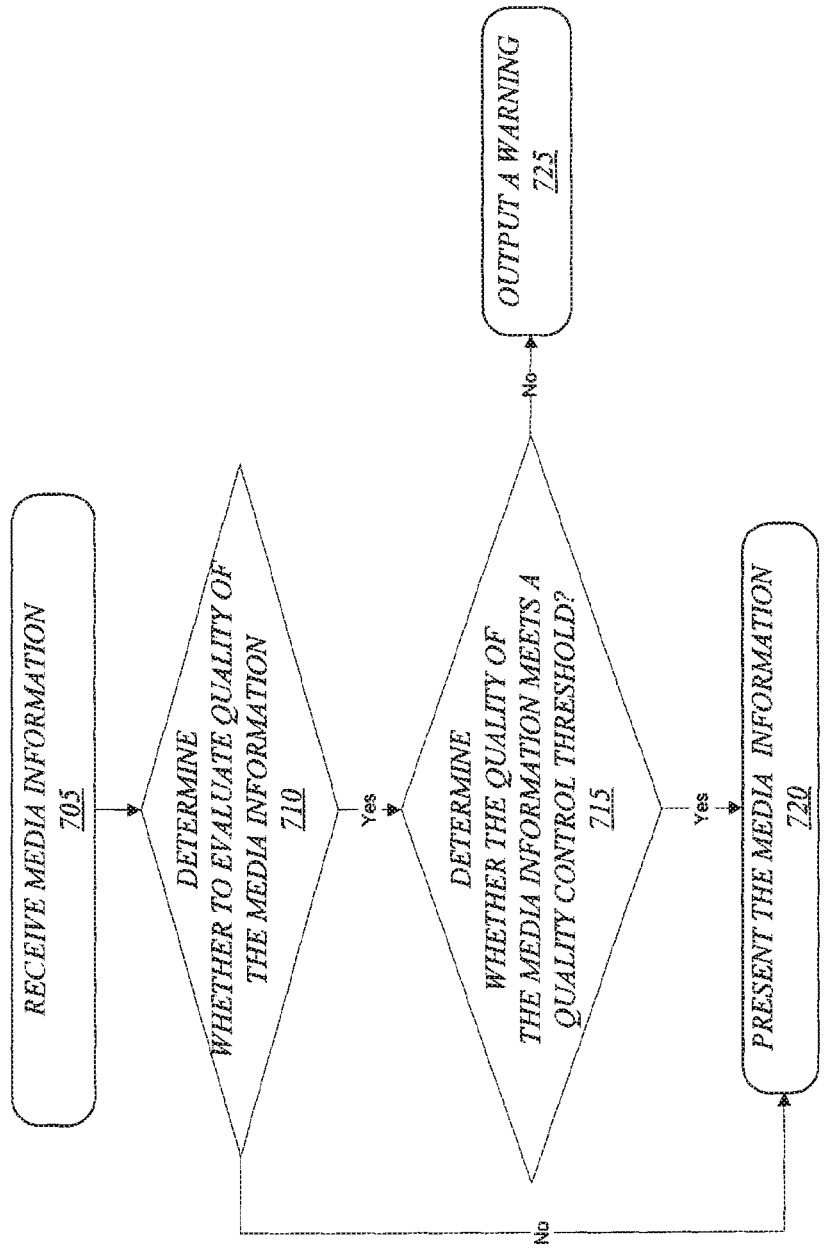
FIG. 7 illustrates a third logic flow.

FIG. 7 illustrates a logic flow of presenting media information to a computing device. The logic flow 700 may receive media information at block 705. The user may wish to view media information 110 from an internet website. The user may want the media information 110 from the internet website to be presented on a display of the computing device 602.

The logic flow 700 may determine whether to evaluate quality of the media information at block 710. Based on the type of the media information 110, the media quality control application 620 may determine whether to evaluate the quality of the media information 110. When the media type component 122 determines that the media information 110 is a three dimensional game, the media information 110 may not be evaluated. Three dimensional games may not be evaluated by the media quality control application 620 as games include interactive frames and the graphics engine may change the frames of the media information 110 according to input received from the computing device 602. Due to the change in frames of the media information 110, the media quality control application 620 may have difficulty evaluating the quality of the media information 110 during real-time gameplay. Further, continued evaluations may interfere with real-time gameplay, such as presenting warning messages during gameplay or slowing down gameplay due to overhead incurred by image analysis performed by the media quality control application 620. As such, the media quality control application 620 may evaluate quality for a three dimensional game prior to commencement of gameplay, such as when a three dimensional game is first downloaded or streamed, without evaluating whether the game meets the quality control threshold at block 720 during real-time gameplay of the three dimensional game. Alternatively, the media quality control application 620 may update the quality parameter 130 for a three dimensional game in response to certain events detected during gameplay, such as completion of a mission, quest, stage or level, entrance of another player, exiting of an existing player, and so forth. Alternatively, the media quality control application 620 may update the quality parameter 130 at periodic, aperiodic or on-demand basis. Embodiments are not limited in this context.

The media quality control application 620 may determine that the media information 110 should be evaluated as the media type may be a three dimensional video. The logic flow 700 may determine whether the quality of the media information 110 meets a quality control threshold at block 715. If the quality of the media information 110 meets the quality control threshold, the logic flow 700 may present the media information 110 at block 720. The media quality control application 620 may present the media information 110 on a display 625 of the computing device 602 (or another device).

If the media information 110 does not meet the quality control threshold, then the logic flow 700 may output a warning at block 725. The media quality control application 620 may output a warning to the display 625 of the computing device 602 that the media information 110 did not meet the quality control threshold.

Figure 8:
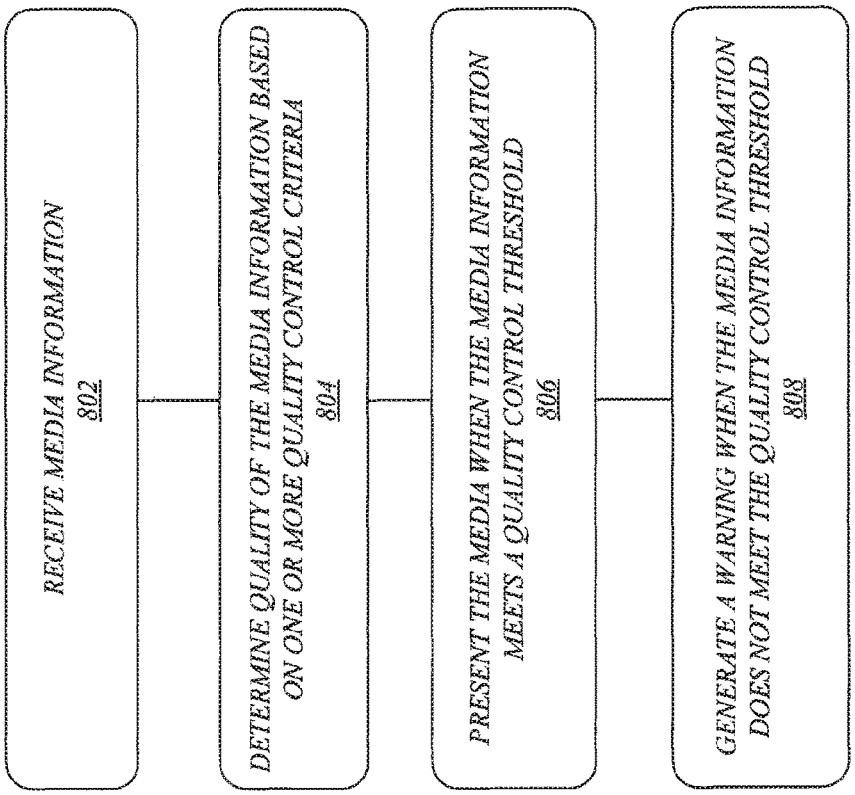
FIG. 8 illustrates an embodiment of quality control criteria.

FIG. 8 illustrates one embodiment of a logic flow 800. The logic flow 800 may be representative of some or all of the operations executed by one or more embodiments described herein.

In the illustrated embodiment shown in FIG. 8, the logic flow 800 may receive media information at block 802. Media information 110 may include, but is not limited to, three dimensional video, two dimensional video, three dimensional video games or two dimensional video games. The media information 110 may be received by a computing device 602. The media information 110 may be uploaded from a computing device 602 (or computing device 302) to a server (e.g., server 350) and/or downloaded or streamed from the server 350 to the computing device 602 (or computing device 302).

The logic flow 800 may determine the quality of the media information based on one or more quality control criteria at block 804. The quality control criteria 200 may include, but are not limited to, alignment 205, luminance 210, depth of field 215, improper objects 220, mismatch values 235, reverse stereo 350, and hyperconvergence/hyperdivergence 254, among other criteria. The embodiments are not limited to these examples.

The logic flow 800 may present the media information when the media information meets a quality control threshold at block 806. The quality of the media information 110 may be compared to a quality control threshold. The quality control threshold may be defined value for downloading media information 110 to the user. For instance, the quality control threshold may comprise minimum acceptable values for one or more quality control criteria 200. When the quality of the media information 110 meets the quality control threshold, the media information 110 may be presented to a user via a display 625 on a computing device 602.

The logic flow 800 may generate a warning when the media information does not meet a quality control threshold at block 808. For example, the quality of the media information 110 may be poor. As a result of the poor quality of the media information 100, a warning may be generated and presented to a user. The warning may inform the user of the poor quality. The warning may state the criteria or criterion which did not meet the quality control threshold. For example, the warning may state that the media information 110 does not have a zero vertical disparity. After the warning, the media quality control application 620 may allow the user to view the media information 110 or the media quality control application 620 may prevent the user from viewing the media information 110 or some other defined action. The embodiments are not limited to this example.

Figure 9:
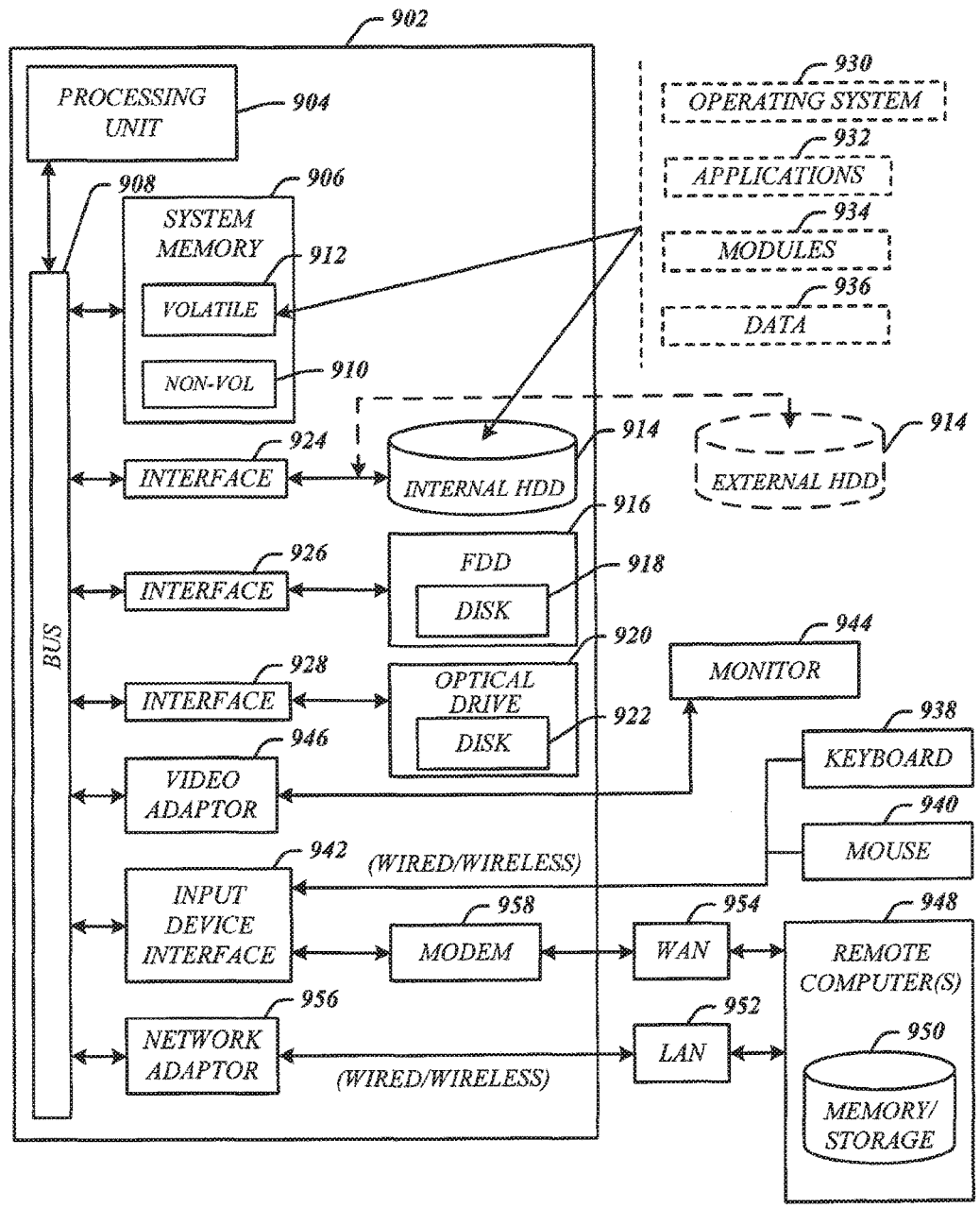
FIG. 9 illustrates an embodiment of a computing architecture.

FIG. 9 illustrates an embodiment of an exemplary computing architecture 900 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a processor circuit, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 900 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 900 includes various common computing elements, such as one or more processors, multi-processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors. Dual microprocessors and other multi-processor architectures may also be employed as the processing unit 904. The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936.

The one or more application programs 932, other program modules 934, and program data 936 can include, for example, the media type component 122, the user payment component 124 and the quality review component 126.

A user can enter commands and information into the computer 902 through one or more wire/wireless input devices, for example, a keyboard 938 and a pointing device, such as a mouse 940. Other input devices may include a microphone, an infra-red (IR) remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
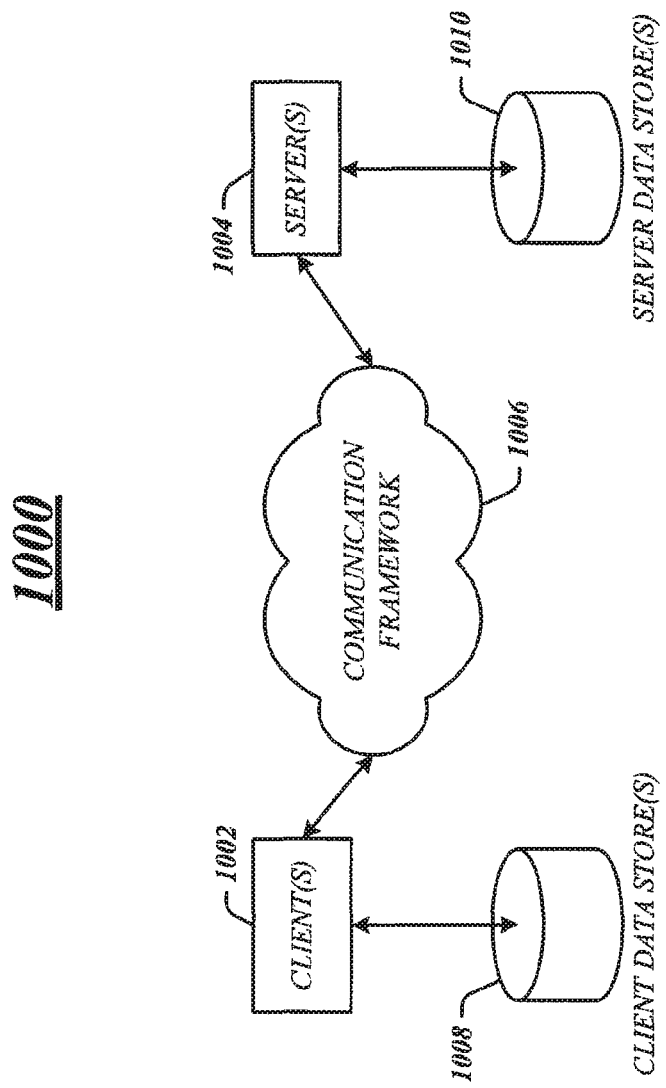
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, and so forth. The embodiments, however, are not limited to implementation by the communications architecture 1000.

As shown in FIG. 10, the communications architecture 1000 comprises includes one or more clients 1002 and servers 1004. The clients 1002 may implement the client systems 302, 602. The servers 1004 may implement the server system 350. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols, such as those described with reference to systems 100, 300, 600 and 900. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

A computer-implemented method may receive media information and determine quality of the media information. The media information may be downloaded when the quality of the media information meets a quality control threshold. A warning may be generated when the quality of the media information does not meet the quality control threshold. It may be determined whether the quality of the media information meets the quality control threshold. The media information may include three dimensional video. The media information may be presented. A payment status associated with a user of the media information may be determined. It may be determined whether a user associated with the media information has a subscription to a media quality control application. The media information may be streamed from a server. A login may be received from a user and a subscription type for the user may be determined. A second may be received and the second media information may be uploaded when quality of the second media information meets a quality control threshold. The media information may include a video game and the media information may be presented without determining the quality of the media information.

In an embodiment, at least one machine readable medium comprising a plurality of instructions that in response to being executed on a computing device cause the computing device to receive media information, determine quality of the media information, download the media information when the quality of the media information meets a quality control threshold and generate a warning when the quality of the media information does not meet the quality control threshold.

An apparatus may include a processing unit and a media quality control application operatively coupled to the processing unit. The media quality control application may include a media quality control threshold component operative to determine quality of media information, download the media information when the quality of the media information meets a quality control threshold, and generate a warning when the quality of the media information does not meet the quality control threshold. The apparatus may include a digital display operatively coupled to the processing unit. The digital device may display the media information. The apparatus may include an antenna coupled to the processing unit. The antenna may receive the media information. The media quality control application may include a media type component operative to receive the media information. The media quality control threshold component may be operative to download the media information. The media quality control application may include a user payment component operative to determine a payment status associated with a user of the media information. The media quality control application may include a user payment component operative to determine whether a user associated with the media information has a subscription to a media quality control application. The media quality control application may include a user payment component operative to receive a payment for determining the quality of the media information. The media quality control application may include a user payment component operative to receive a login associated with a user and determine a subscription type for the user. The media quality control application may include a media type component operative to determine whether the media information is a video game.

What is claimed is:

1. An apparatus, comprising:
   a processor circuit; and
   a memory storing instructions executable by the processor to:
   analyze an image data of a media information to determine a plurality of quality control parameters of the image data, the image data of the media information comprising a left image and a right image for each of a plurality of frames of the media information,
   determine a quality of the media information based on the plurality of quality control parameters and a plurality of quality control criteria, each quality control parameter associated with a respective quality control criterion of the plurality of quality control criteria, the plurality of quality control criteria comprising: (i) a horizontal alignment of the left image matching a horizontal alignment of the right image of each frame, (ii) a hue of the left image matching a hue of the right image of each frame, (iii) a focus of the left image matching a focus of the right image, and (iv) an edge mismatch of the left image matching an edge mismatch of the right image,
   present the media information when the quality control parameters of the image data of the media information meet a respective quality control threshold for the associated quality control criterion, and
   generate a warning when at least one of the quality control parameters of the image data of the media information does not meet the respective quality control threshold for the associated quality control criterion.

2. The apparatus of claim 1, comprising instructions executable by the processor to:
   receive the media information, and
   determine whether a type of the media information comprises a three-dimensional video or a three-dimensional game.

3. The apparatus of claim 2, the plurality of quality control criteria further comprising: (v) a vertical alignment of the left image matching a vertical alignment of the right image of each frame, and (vi) a depth of the left image matching a depth of the right image of each frame, the apparatus comprising:
   an antenna operatively coupled to the processor circuit, the antenna operative to receive the media information.

4. The apparatus of claim 3, the quality of the media information comprising a composite score computed based on a respective weight applied to each of the plurality of quality control parameters for the left image and the right image of each frame, the apparatus comprising:
a digital display operatively coupled to the processor circuit, the digital display operative to present the media information.

5. The apparatus of claim 4, a quality control threshold for a first quality control criterion of the plurality of quality control criteria comprising a value received from a user, the apparatus comprising instructions executable by the processor to determine a payment status associated with a user of the media information.

6. The apparatus of claim 2, comprising instructions executable by the processor to:
determine that the type comprises the three-dimensional video game; and
determine that a first frame of the plurality of frames comprises an interactive frame configured to wait for user input, the plurality of quality control parameters for the interactive frame not determined based on the interactive frame being configured to wait for user input.

7. The apparatus of claim 1, comprising instructions executable by the processor to:
receive a payment for determining the quality of the media information; and
determine whether a user associated with the media information has a subscription.

8. The apparatus of claim 1, comprising instructions executable by the processor to:
receive a login associated with a user and determine a subscription type for the user.

9. The apparatus of claim 1, comprising instructions executable by the processor to:
determine whether the media information comprises a video game.

10. A computer-implemented method, comprising:
analyzing, by a processor circuit, an image data of a media information to determine a plurality of quality control parameters of the image data, the image data of the media information comprising a left image and a right image for each of a plurality of frames of the media information;
determining, by the processor circuit, a quality of the media information based on the plurality of quality control parameters and a plurality of quality control criteria, each quality control parameter associated with a respective quality control criterion of the plurality of quality control criteria, the plurality of quality control criteria comprising: (i) a horizontal alignment of the left image matching a horizontal alignment of the right image of each frame, (ii) a hue of the left image matching a hue of the right image of each frame, (iii) a focus of the left image matching a focus of the right image, and (iv) an edge mismatch of the left image matching an edge mismatch of the right image,
presenting, by the processor circuit, the media information when the quality control parameters of the image data of the media information meet a respective quality control threshold for the associated quality control criterion; and
generating, by the processor circuit, a warning when at least one of the quality control parameters of the image data of the media information does not meet the respective quality control threshold for the associated quality control criterion.

11. The computer-implemented method of claim 10, the plurality of quality control parameters determined based on an image analysis of the image data of the media information, the method comprising:
determining whether each quality control parameters of the image data of the media information meet the respective quality control threshold for the associated quality control criterion.

12. The computer-implemented method of claim 11, comprising:
determining that the media information is a three-dimensional video.

13. The computer-implemented method of claim 12, the plurality of quality control criteria further comprising: (v) a vertical alignment of the left image matching a vertical alignment of the right image of each frame, and (vi) a depth of the left image matching a depth of the right image of each frame, comprising:
determining a payment status associated with a user of the media information.

14. The computer-implemented method of claim 13, a quality control threshold for a first quality control criterion of the plurality of quality control criteria comprising a value received from a user, the method comprising:
determining whether a user associated with the media information has a subscription.

15. The computer-implemented method of claim 10, comprising:
streaming the media information from a server.

16. The computer-implemented method of claim 10, comprising:
receiving a login associated with a user; and
determining a subscription type for the user.

17. The computer-implemented method of claim 10, comprising:
receiving a second media information; and
uploading the second media information when quality of the second media information meets the quality control threshold.

18. The computer-implemented method of claim 10, comprising:
determining that the media information comprises a video game having at least one interactive frame configured to wait for user input; and
downloading the media information without determining the quality of the media information.

19. At least one non-transitory machine-readable medium comprising a plurality of instructions that in response to being executed on a computing device cause the computing device to:
analyze an image data of a media information to determine a plurality of quality control parameters of the image data, the image data of the media information comprising a left image and a right image for each of a plurality of frames of the media information;
determine a quality of the media information based on the plurality of quality control parameters and a plurality of quality control criteria, each quality control parameter associated with a respective quality control criterion of the plurality of quality control criteria, the plurality of quality control criteria comprising: (i) a horizontal alignment of the left image matching a horizontal alignment of the right image of each frame, (ii) a hue of the left image matching a hue of the right image of each frame, (iii) a focus of the left image matching a focus of the right image, and (iv) an edge mismatch of the left image matching an edge mismatch of the right image;

present the media information when the quality control parameters of the image data of the media information meet a respective quality control threshold for the associated quality control criterion; and generate a warning when at least one of the quality control parameters of the image data of the media information does not meet the respective quality control threshold for the associated quality control criterion.

20. The at least one non-transitory machine-readable medium of claim 19, the plurality of quality control parameters determined based on an image analysis of the image data of the media information, the at least one non-transitory medium comprising a plurality of instructions that in response to being executed on a computing device cause the computing device to:

determine whether a user associated with the media information has a subscription; and determine whether a type of the media information comprises a three-dimensional video or a three-dimensional game.

\* \* \* \* \*